United States Patent
Kanome et al.

(10) Patent No.: US 7,070,344 B2
(45) Date of Patent: Jul. 4, 2006

(54) PRODUCTION PROCESS OF LIGHT AMOUNT ADJUSTMENT MEMBER, LIGHT AMOUNT ADJUSTMENT DEVICE AND PHOTOGRAPHING APPARATUS

(75) Inventors: Osamu Kanome, Kanagawa (JP); Ryuji Katsuragi, Tokyo (JP); Takeshi Miyazaki, Kanagawa (JP); Ichiro Onuki, Kanagawa (JP); Eriko Namazue, Tokyo (JP); Kohei Watanabe, Tokyo (JP); Akio Kashiwazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 10/872,503

(22) Filed: Jun. 22, 2004

(65) Prior Publication Data

US 2005/0008358 A1    Jan. 13, 2005

(30) Foreign Application Priority Data

Jun. 26, 2003    (JP)    ............................. 2003-182235
Jun. 16, 2004    (JP)    ............................. 2004-178536

(51) Int. Cl.
*G03B 9/02*    (2006.01)
(52) U.S. Cl. .................................................... 396/505
(58) Field of Classification Search ................ 396/505; 348/340, 342, 360–366; 359/888, 889
See application file for complete search history.

(56) References Cited

U.S. PATENT DOCUMENTS

| | | | |
|---|---|---|---|
| 5,293,542 A | * | 3/1994 | Ise et al. .................... 348/363 |
| 5,479,298 A | | 12/1995 | Yanagi et al. ................ 359/888 |
| 5,725,959 A | | 3/1998 | Terada et al. ................ 428/448 |
| 6,091,448 A | | 7/2000 | Washisu et al. .............. 348/208 |
| 6,392,696 B1 | | 5/2002 | Onuki ......................... 348/208 |
| 6,771,315 B1 | * | 8/2004 | Nanjo et al. ................. 348/362 |
| 6,866,431 B1 | * | 3/2005 | Namazue et al. ............ 396/450 |
| 2003/0086014 A1 | * | 5/2003 | Murata et al. ............... 348/363 |

FOREIGN PATENT DOCUMENTS

| | | |
|---|---|---|
| JP | 5-173004 | 7/1993 |
| JP | 6-95208 | 4/1994 |
| JP | 6-273601 | 9/1994 |
| JP | 10-96971 | 4/1998 |
| JP | 10-133254 | 5/1998 |
| JP | 11-15042 | 1/1999 |
| JP | 2000-352736 | 12/2000 |

* cited by examiner

*Primary Examiner*—W. B. Perkey
(74) *Attorney, Agent, or Firm*—Fitzpatrick, Cella, Harper & Scinto

(57) ABSTRACT

A light amount adjustment member, which causes little deterioration of image quality by diffraction at a grain boundary between ink dots in a colored portion, can be simply produced at low production cost and high yield. The light amount adjustment member has a density distribution such that an optical density varies continuously or stepwise. The process comprises steps of providing a transparent base material having a receptive layer comprised of a material capable of absorbing a coloring liquid and containing a resin and crosslinking agent, applying the coloring liquid to the layer using an ink-jet recording method to form a light amount adjustment region having a particular optical density region, storing the layer under a prescribed environment after application of the coloring liquid to the layer to cause dots formed by the coloring liquid to bleed and crosslinking the resin contained in the layer by the crosslinking agent.

11 Claims, 4 Drawing Sheets

GRADATION VALUE

FIG. 5

GRADATION VALUE

PRODUCTION PROCESS OF LIGHT AMOUNT ADJUSTMENT MEMBER, LIGHT AMOUNT ADJUSTMENT DEVICE AND PHOTOGRAPHING APPARATUS

BACKGROUND OF THE INVENTION

1. Field of the Invention

The present invention relates to a production process of a light amount adjustment member used in optical instruments such as digital cameras and video cameras, a light amount adjustment member, a light amount adjustment device, and a photographing apparatus.

2. Related Background Art

In an image forming (photographing) optical system used in an optical instrument, such as a camera, a light amount adjustment device that controls light quantity of an incident beam, i.e., the so-called diaphragm device, is generally contained. In such a diaphragm device, a plurality of diaphragm blades form an opening of a prescribed area, and the quantity of a beam passing through the opening is controlled by controlling an opening diameter of the opening by an actuator. However, an influence of diffraction caused at an end of the diaphragm blade becomes great as the opening diameter of the opening is made small, so that the image forming performance of the image forming optical system is deteriorated. On the other hand, there has been known a technique that a filter as a light amount adjustment member is provided at a part of the diaphragm blade in order to avoid this defect, thereby attenuating the quantity (light quantity) of a bundle of rays passing through the opening by the optical filter instead of making the opening diameter small. The optical filter used for such purposes is required to lessen optical defects such as light scattering, refraction abnormality and spectral transmittance deviation.

Those of the type in which a light-absorbing coloring material such as a pigment or dye is mixed and incorporated into a transparent film-forming material have heretofore been generally used for such a light amount adjustment member. However, light amount adjustment members produced by this method have been very expensive and have not sufficiently satisfied cost reduction required of increasing demand. In addition, with the method in which the coloring material is incorporated into the transparent film-forming material, it is markedly difficult to produce a light amount adjustment member having a continuous or stepwise density distribution (hereinafter referred to as "multi-density").

As another production method, for example, Japanese Patent Application Laid-Open No. H5-173004 discloses a method of producing a multi-density light amount adjustment member using a silver halide film. However, the light amount adjustment member obtained by this method causes a problem characteristic of the use of the silver halide film that the rectilinearity of rays passed through a filter is impaired by reflection of a beam on the surfaces of silver particles contained in the filter and diffraction of a beam passed through ends of the silver particles to deteriorate the image forming performance of the optical system.

Japanese Patent Application Laid-Open No. H10-133254 discloses a method of producing a multi-density light amount adjustment member by a vapor deposition method. However, this method incurs increase in production cost and is thus expensive. In addition, since the film thickness thereof varies according to the density, a problem arises in that a difference in film thickness arises between a high-density portion and a low-density portion, and consequently, an optical path difference arises to deteriorate resolution. Further, according to this method, a light amount adjustment member in which the density distribution varies stepwise can be produced, but that having a continuously varied density distribution is difficult to produce.

Japanese Patent Application Laid-Open No. H10-96971 discloses a process of producing a light amount adjustment member having a density distribution by first incorporating organic coloring matter, which fades by light, in a film forming material, and partially irradiating the resultant film with high-energy light to decompose the organic coloring matter at irradiated portions. However, according to this process, usable coloring materials are limited to those which fade by light. It is therefore very difficult to obtain a product having sufficient optical properties. In addition, it may be easily inferred that resulting products will become very expensive because of the production process.

Further, Japanese Patent Application Laid-Open No. 2000-352736 discloses a process of producing a filter as a light amount adjustment member that a transmittance varies steplessly by forming a film having a single density in the form of halftone dots by vapor deposition or a printing process such as a photomechanical process and varying a halftone dot pattern from position to position. However, in such a process, a film of a prescribed density is formed by the photomechanical process or vapor deposition. Even if either process is adopted, a problem that the apparatus becomes large and expensive to increase the production cost of the filter arises.

SUMMARY OF THE INVENTION

Accordingly, it is an object of the present invention to provide a simple production process of a light amount adjustment member, by which the above-described problems of the prior art can be solved, and a light amount adjustment member can be simply produced at low production cost and high yield.

Another object of the present invention is to provide a production process of a light amount adjustment member, by which a light amount adjustment member with a region (colored portion) having a density distribution that an optical density varies continuously or stepwise can be simply obtained.

A further object of the present invention is to provide a light amount adjustment member, which is produced by the above-described simple production process, is inexpensive and has excellent properties, and a light amount adjustment device and a photographing apparatus equipped with the light amount adjustment member.

A still further object of the present invention is to provide a light amount adjustment member which causes little deterioration of image quality by diffraction at an intergranular surface of dots of a colored portion in the light amount adjustment member produced by an ink-jet recording apparatus.

The above objects can be achieved by the present invention described below.

In an aspect of the present invention, there is thus provided a process for producing a light amount adjustment member, which comprises the steps of providing a transparent base material having a receptive layer composed of a material capable of absorbing a coloring liquid and applying the coloring liquid to the layer using an ink-jet recording method to form a light amount adjustment region having a particular optical density region, wherein the receptive layer contains a resin and a crosslinking agent, and the process further comprises the steps of storing the layer under a prescribed environment after the application of the coloring liquid to the layer to cause dots formed by the coloring liquid to bleed and crosslinking the resin contained in the layer by the crosslinking agent.

As preferred aspects of the production process of the light amount adjustment member related to the above aspect, the following aspects (1) to (5) may be mentioned.

(1) The production process, wherein in the step of applying the coloring liquid to form the light amount adjustment region having the particular optical density region, a transparent liquid and the coloring liquid are applied to the receptive layer.

(2) The production process, wherein the coloring liquid is applied in such a manner that the light amount adjustment region has a density distribution that varies continuously or stepwise.

(3) The production process, which further comprises the step of applying a transparent liquid to the receptive layer before the step of applying the coloring liquid to form the light amount adjustment region having the particular optical density region.

(4) The production process, wherein the prescribed environment is such that a relative humidity is from 70 to 90%, and a temperature is from 30 to 70° C.

(5) The production process, which further comprises the step of providing a transparent flattening layer on the surface of the receptive layer after the step of crosslinking the resin by the crosslinking agent.

In another aspect of the present invention, there is also provided a light amount adjustment device comprising the light amount adjustment member produced by the production process described above.

In a further aspect of the present invention, there is provided a photographing device comprising the light amount adjustment device described above, a photographing optical system for forming a subject image, an image pickup means for photoelectrically converting the subject image formed and a recording means for recording a signal photoelectrically converted, wherein the light amount adjustment device is arranged in the photographing optical system.

DETAILED DESCRIPTION OF THE PREFERRED EMBODIMENTS

The present invention will hereinafter be described in more detail by the preferred embodiments of the present invention.

No particular limitation is imposed on the transparent base material usable in the present invention as long as it has necessary properties such as mechanical strength as a light amount adjustment member and optical properties. As examples thereof, transparent films composed of polyethylene terephthalate, diacetate, triacetate, cellophane, celluloid, polycarbonate, polyimide, polyvinyl chloride, polyvinylidene chloride, polyacrylate, polyethylene, polypropylene or the like may be mentioned. Transparent glass may also be used as the base material as long as it satisfies the above-described necessary properties. The surface of the transparent base material suitably selected from the above-mentioned materials may be subjected to various kinds of treatments such as plasma treatment, UV treatment, UV ozone treatment, corona treatment and silane coupling treatment to modify the surface of the transparent base material. These treatments may serve to improve adhesion when a receptive layer (hereinafter referred to as "receptive layer") capable of absorbing a coloring liquid is formed on the transparent base material.

As a process for forming the receptive layer on such a base material as described above, such a process as described below may be used. A resin forming the receptive layer and a crosslinking agent are first dissolved or dispersed together with other optional additives in water, an alcohol, a polyhydric alcohol or any other proper organic solvent to prepare a coating formulation. The coating formulation thus obtained is then applied to the surface of the base material by a roll coater or spin coating process, or the like. Thereafter, the coating formulation thus applied is dried by means of, for example, a hot air drying oven, heated drum, hot plate or the like to form a receptive layer.

No particular limitation is imposed on the resin used in the formation of the receptive layer so long as the coloring liquid is absorbed in the layer when the layer is formed on the transparent base material, a coloring material in the coloring liquid can be fixed in the layer, and the resin can be crosslinked with the crosslinking agent. Examples of a water-soluble resins may include synthetic resins, such as polyvinyl alcohol and modified product of polyvinyl alcohol, such as anionically modified polyvinyl alcohol, cationically modified polyvinyl alcohol and acetal-modified polyvinyl alcohol; hydrophilic polyurethane; polyvinyl pyrrolidone and modified products of polyvinyl pyrrolidone, such as vinylpyrrolidone-vinyl acetate copolymers, vinylpyrrolidone-dimethylaminoethyl methacrylate copolymers, quaternized vinylpyrrolidone-dimethylaminoethyl methacrylate copolymers and vinylpyrrolidone-methacrylamidopropyltrimethylammonium chloride copolymers; cellulosic water-soluble resins such as carboxymethyl cellulose, hydroxyethyl cellulose and hydroxypropyl cellulose, and modified products of cellulose, such as cationic hydroxyethyl cellulose; polyester, polyacrylic acid (esters), melamine resins and modified products thereof; and graft copolymers containing at least polyester and polyurethane; and natural resins such as albumin, gelatin, casein, starch, cationic starch, gum arabic and sodium alginate.

Examples of water-dispersing resins may include a large number of resins such as polyvinyl acetate, ethylene-vinyl acetate copolymers, polystyrene, styrene-(meth)acrylic ester copolymers, (meth)acrylic ester polymers, vinyl acetate- (meth)acrylic acid (ester) copolymers, poly(meth)acrylamide, (meth)acrylamide copolymers, styrene-isoprene copolymers, styrene-butadiene copolymers, styrene-propylene copolymers, poly(vinyl ether) and silicone-acrylic copolymers. The present invention is not limited thereto.

Those of the void-absorption type in which the above-described water-soluble resin or water-dispersing resin is used as a binder, and, for example, a pigment such as alumina hydrate, silica or calcium carbonate is mixed with such a material may also be used within limits satisfying the optical properties.

As the crosslinking agent used in the present invention, various crosslinking agents, such as maleic anhydride copolymers, polycarbodiimide resins, alkylated amino resins, organic metal compounds such as organic titanium compounds and organic zirconium compounds, polycarboxylic acids, epoxy compounds, aldehydes, oxazoline-group-containing polymers, polyisocyanate-group-containing polymers, and metal salt divinyl crosslinking agents may be used. However, the present invention is not limited thereto. Among these, the maleic anhydride copolymers are preferred. If the crosslinking agent is too little, the resin cannot be sufficiently crosslinked, so that the weathering resistance of the resulting receptive layer becomes insufficient. If the crosslinking agent is too great, the resulting receptive layer involves problems that the ability to absorb the coloring liquid becomes poor, and unevenness of coloring is easy to occur. It is thus preferable to use the crosslinking agent in a proportion of 1:20 to 2:1 to the resin. In order to control coating ability and performance of absorbing the coloring liquid and to improve mechanical properties, various kinds of surfactants, dye sticking agents (water-proofing agents), antifoaming agents, antioxidants, viscosity modifiers, pH adjustors, mildewcides and plasticizers, and the like may be contained in the coating formulation in addition to the above-described material as needed.

An example of a combination of the resin and crosslinking agent preferably used in the receptive layer in the present invention may be a combination of PVA and a maleic anhydride copolymer.

The thickness of the receptive layer used in the present invention varies according to the kind of the resin used. However, it is preferably, for example, from 1 to 30 µm because the coloring-liquid-receiving ability of the receptive layer becomes poor if the thickness is too thin, and unevenness of light-transmitting ability and film thickness is easy to occur if the thickness is too great.

A coloring liquid for forming a colored portion on the receptive layer provided on the transparent base material will hereinafter be described. The coloring liquid used in the present invention contains at least a coloring material and a liquid medium dissolving or dispersing the coloring material therein. A transparent liquid for forming a transparent portion on the transparent base material will now be described. As the transparent liquid used in the present invention, a liquid medium is used. The liquid medium contained in the coloring liquid and the liquid medium contained in the transparent liquid may be the same or different from each other. Those poor in absorption in the intended wavelength range are desirable as the liquid media used in these liquids.

As the liquid media used in the coloring liquid and transparent liquid in the present invention, organic solvents miscible with water may be used. Examples of the organic solvents include those having high moisturizability and excellent hydrophilicity, those having organicity and good wettability to a hydrophobic surface, solvents having evaporating and drying ability, and low-viscosity solvents having moderate wettability. The liquid media preferably contain a water-soluble organic solvent and water. Examples of the water-soluble organic solvent include ethylene glycol, diethylene glycol, triethylene glycol, tripropylene glycol, glycerol, 1,2,4-butanetriol, 1,2,6-hexanetriol, 1,2,5-pentanetriol, 1,2-butanediol, 1,3-butanediol, 1,4-butanediol, dimethyl sulfoxide, diacetone alcohol, glycerol monoallyl ether, propylene glycol, butylene glycol, polyethylene glycol 300, thiodiglycol, N-methyl-2-pyrrolidone, 2-pyrrolidone, g-butyrolactone, 1,3-dimethyl-2-imidazolidinone, sulfolane, trimethylolpropane, trimethylolethane, neopentyl glycol, ethylene glycol monomethyl ether, ethylene glycol monoethyl ether, ethylene glycol monoisopropyl ether, ethylene glycol monomethyl ether, ethylene glycol monoallyl ether, diethylene glycol monoethyl ether, triethylene glycol monomethyl ether, triethylene glycol monoethyl ether, propylene glycol monomethyl ether, dipropylene glycol monomethyl ether, b-dihydroxyethylurea, urea, acetonylacetone, pentaerythritol, 1,4-cyclohexanediol, hexylene glycol, ethylene glycol monopropyl ether, ethylene glycol mono-n-butyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, glycerol monoacetate, glycerol diacetate, glycerol triacetate, ethylene glycol monomethyl ether acetate, diethylene glycol monomethyl ether acetate, cyclohexanol, 1,2-cyclohexanediol, 3-methyl-1,5-pentanediol, 3-hexene-2,5-diol, 2,3-butanediol, 1,5-pentanediol, 2,4-pentanediol, 2,5-hexanediol, 1-methoxy-2-propanol, furfuryl alcohol and tetrahydrofurfuryl alcohol. The overall amount of the water-soluble solvent used in the coloring liquid is preferably within a range of generally from 5 to 40% by weight based on the whole weight of the coloring liquid.

No particular limitation is imposed on the coloring liquid or transparent liquid according to the present invention as long as it can be ejected by an ink-jet recording apparatus. Any of water-based and oil-based coloring or transparent liquids may be used as the coloring liquid or transparent liquid. However, the water-based coloring liquid and/or transparent liquid may preferably be used from the viewpoint of ejection reliability from the ink-jet recording apparatus. A low-boiling alcohol may also be added for the purpose of, for example, modifying the viscosity of the resulting coloring liquid or transparent liquid.

As a coloring material in the coloring liquid used in the present invention, any coloring material may be used as long as it can form a colored portion that is a region having a specific optical density when the coloring liquid is applied on to the transparent base material. Accordingly, the term "coloring material" as used in the present invention means a material that controls the transmittance of light within a prescribed wavelength band including visible light, ultraviolet light and infrared light. When an ND filter (neutral density filter) is produced in accordance with the production process of the light amount adjustment member according to the present invention, for example, that giving uniform transmission properties over the whole visible light band is utilized as the coloring material. However, the present invention is not limited thereto. In the case where a light amount adjustment member used in, for example, a light amount adjustment device for infrared cameras is formed, a material that transmits only particular wavelengths in an infrared band is used. This material is also included in the coloring materials meant in the present invention. Those in which absorption of light in controlling a quantity of light transmitted occurs in the interior of the material or at the surface of the material are also included in the coloring materials meant in the present invention. Specifically, various kinds of dyes and pigments may be used. As the pigments, any of organic pigments and inorganic pigments (various kinds of metals, metal oxides, metal nitrides and their complexes as well as complexes with organic fine particles or the like) may also be used. The various kinds of dyes, organic pigments, inorganic pigments and the like may be suitably used in combination.

In order to provide a coloring liquid having desired physical properties, various kinds of surfactants, dye sticking agents (water-proofing agents), antifoaming agents, antioxidants, viscosity modifiers, pH adjustors, plasticizers and preservatives, and the like may be further added to the coating liquid used in the present invention as needed. That obtained by mixing and dispersing fine particles of alumina hydrate, silica, calcium carbonate or the like to the coloring liquid described above may be suitably used within limits satisfying the optical properties desired in the present invention.

In the present invention, the coloring liquid is applied to the receptive layer by means of an ink-jet recording apparatus to form the colored portion that is a region having a particular optical density. The transparent liquid is applied to a non-colored portion by means of an ink-jet recording apparatus as needed. Examples of the ink-jet recording apparatus usable in this case include that of the Bubble Jet type in which an electrothermal converter is used as an energy-generating element, and that of the piezo-jet type in which a piezoelectric element is used. In the present invention, any of the ink-jet recording apparatus having these functions may be used.

Various kinds of patterns may be formed according to an object in such a manner that a region having a particular optical density is obtained on the receptive layer in accordance with the production process of the present invention. For example, a region having a uniform optical density and a transparent region may be formed, or a region having a density gradient with an optical density varied continuously or stepwise and a transparent layer may also be formed. The region, in which the optical density has been varied continuously or stepwise, can be easily formed by installing a plurality of inks whose densities differ from each other stepwise as coloring liquids installed in such an ink-jet recording apparatus as described above, or by using these inks and suitably controlling the quantity of the inks ejected.

In particular, the transparent region can also be formed by applying no coloring liquid. However, it is desirable that a transparent portion is formed by applying the transparent liquid in that change in optical properties caused by a minute difference in level caused by whether a liquid is applied or not does not occur. According to the production process of the light amount adjustment member according to the present invention, a light amount adjustment member with a colored portion having a density gradient that an optical density varies continuously or stepwise can be simply produced. Since flexibility of the optical density gradient pattern formed is high according to the process of the present invention, the production process also has such a merit that optical optimization to the properties desired for the light amount adjustment member is made easy.

In the production process of the light amount adjustment member according to the present invention, after the coloring liquid or the coloring liquid and transparent liquid are applied onto the receptive layer in the above-described manner, the layer is stored under a prescribed environment to cause formed dots to bleed. An intergranular surface of dots can be blurred by causing the dots to bleed, and so light scattering at the grain boundary can be prevented to prevent the deterioration of an image caused by insertion of the light amount adjustment member. With respect to the environment at this time, a temperature range is preferably from 30 to 70° C. because the storing time becomes too long if the temperature is too low, and there is a possibility that the material forming the receptive layer may be deteriorated if the temperature is too high. The relative humidity is preferably from 70 to 90% because the temperature of the apparatus is rapidly lowered, and stains on the surface of the resultant light amount adjustment member by dewdrops caused by exposing the receptive layer to the storage environment without raising the temperature of the light amount adjustment member is liable to occur, if the humidity is too high, and it is necessary to lengthen the storing time, if the humidity is too low. The storing time may be suitably selected by measuring the time with which unevenness of dots is smoothened by the storage environment. However, it is preferably generally from 6 to 24 hours within the condition range described above. Thereafter, the crosslinking agent contained in the receptive layer is crosslinked with the resin by heating by means of a hot air drying oven, heated drum, hot plate or the like or irradiation with energy light such as visible light, UV light or electron beam to cure a coating forming the colored portion and transparent portion. The coloring material applied to the receptive layer is fixed by this step to make subsequent migration of the coloring material hard to occur.

In the production process of the light amount adjustment member according to the present invention, it is effective for causing the dots to bleed to swell the receptive layer with a transparent liquid for swelling of the receptive layer in advance before the step of applying the coloring liquid or applying the coloring liquid and transparent liquid to the receptive layer. When the transparent liquid is applied by, for example, an ink-jet system, the transparent liquid is preferably applied to the whole surface of the receptive layer from the viewpoint of uniformity. In the case where the transparent liquid is applied, any of various kinds of coating means such as a spinner, roll coater or gravure coater may also be used. The coloring liquid may be applied in such a state that the receptive layer has been semi-dried after the formation of a film of the receptive layer. In this case, however, it is necessary to successfully control a drying rate because irregularities are liable to occur unless the dried state of the receptive layer is not uniform.

As the transparent liquid for swelling of the receptive layer, the transparent liquid described above may be used.

According to the process of the present invention, the colored portion is formed as a colored resin coating on the transparent base material, and the transparent portion is formed as a transparent resin coating on the transparent base material. In addition, a flattening layer is preferably provided on the coatings as needed. Since the colored portion formed above has been formed by ejecting and applying the coloring liquid or the coloring liquid and transparent liquid, there is a possibility that the swelling may partially occur to form irregularities on the surface. If irregularities are formed even on a partial surface, the optical properties are made uneven, and so it may be difficult in some cases to form the colored portion having the particular optical density region. It is thus useful to subject the surface to a flattening treatment after the formation of the colored portion.

No particular limitation is imposed on a material usable in the formation of the flattening layer as long as it is such a material capable of receiving the coloring liquid as described above and satisfies necessary performance such as adhesion to the resin forming the colored layer, mechanical strength and optical properties. Specifically, for example, an acrylic or epoxy thermosetting resin or photosetting resin may be suitably used. As a process for forming the flattening layer, a process in which a coating formulation comprising such a resin material is applied on to a transparent base material, on which the colored portion has been formed, to form a coating film, and the base material is then baked by means of an oven, hot plate or the like to form a cured coating film, or a process in which the base material is irradiated with an electron beam, ultraviolet light or the like to form a cured coating film may be used. The thickness of the flattening layer formed at this time varies according to required performance. However, the thickness is suitably, for example, about 0.1 to 30 μm.

In addition, in the production process of the light amount adjustment member according to the present invention, an anti-reflection treatment on the front and back surfaces may be suitably used as a means for eliminating surface reflection caused on the surface of the colored resin coating that is the colored portion. The anti-reflection coating is required to have excellent anti-reflection properties in a visible light band and excellent barrier properties to water and harmful gasses. In order to satisfy these requirements, vapor deposition of multi-layer films composed of inorganic materials are suitably used.

For example, the anti-reflection coatings described in Japanese Patent Application Laid-Open No. H6-273601 by the present applicant may be used to prevent occurrence of stray light by surface reflection of the filter and moreover to shut off penetration of water and harmful gasses into the coloring material to prevent deterioration of the coloring material.

The optical predominance in the case where the optical density of the light amount adjustment member is varied stepwise or continuously are described in, for example, Japanese Patent Application Laid-Open Nos. H6-095208 and H11-015042. On the other hand, the investigation by the present inventors has revealed that when the light amount adjustment member produced by the production process according to the present invention, the optical density of which varies stepwise or continuously, is applied to a diaphragm device, the same effects as in the publicly known techniques described above can be achieved though it is obtained by the simple production process.

Figure 1A:
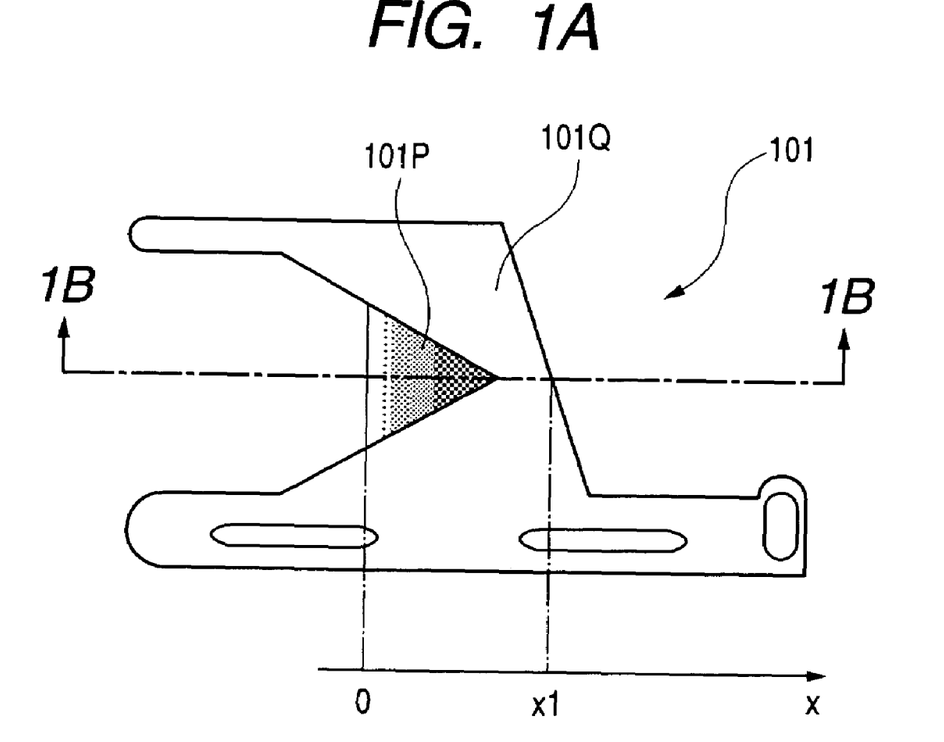
FIG. 1A schematically illustrates a diaphragm blade equipped with a light amount adjustment member according to the present invention.
Figure 1B:
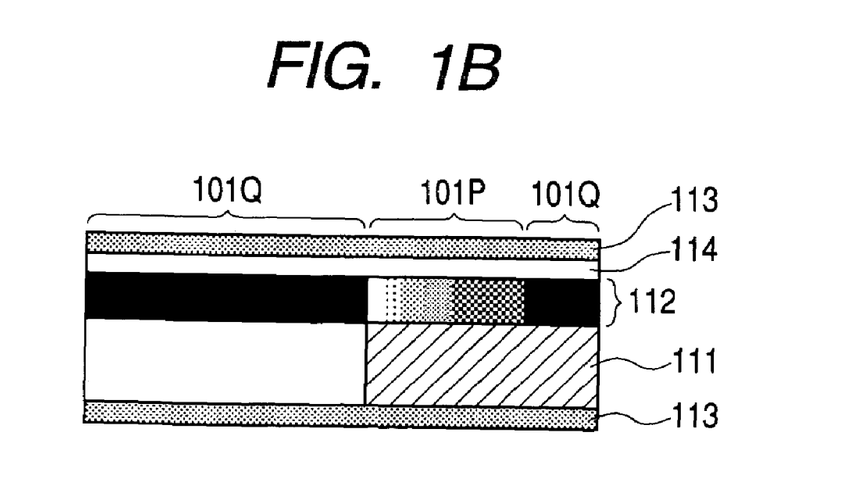
FIG. 1B is a cross-sectional view taken along line 1B—1B in FIG. 1A.
Figure 2:
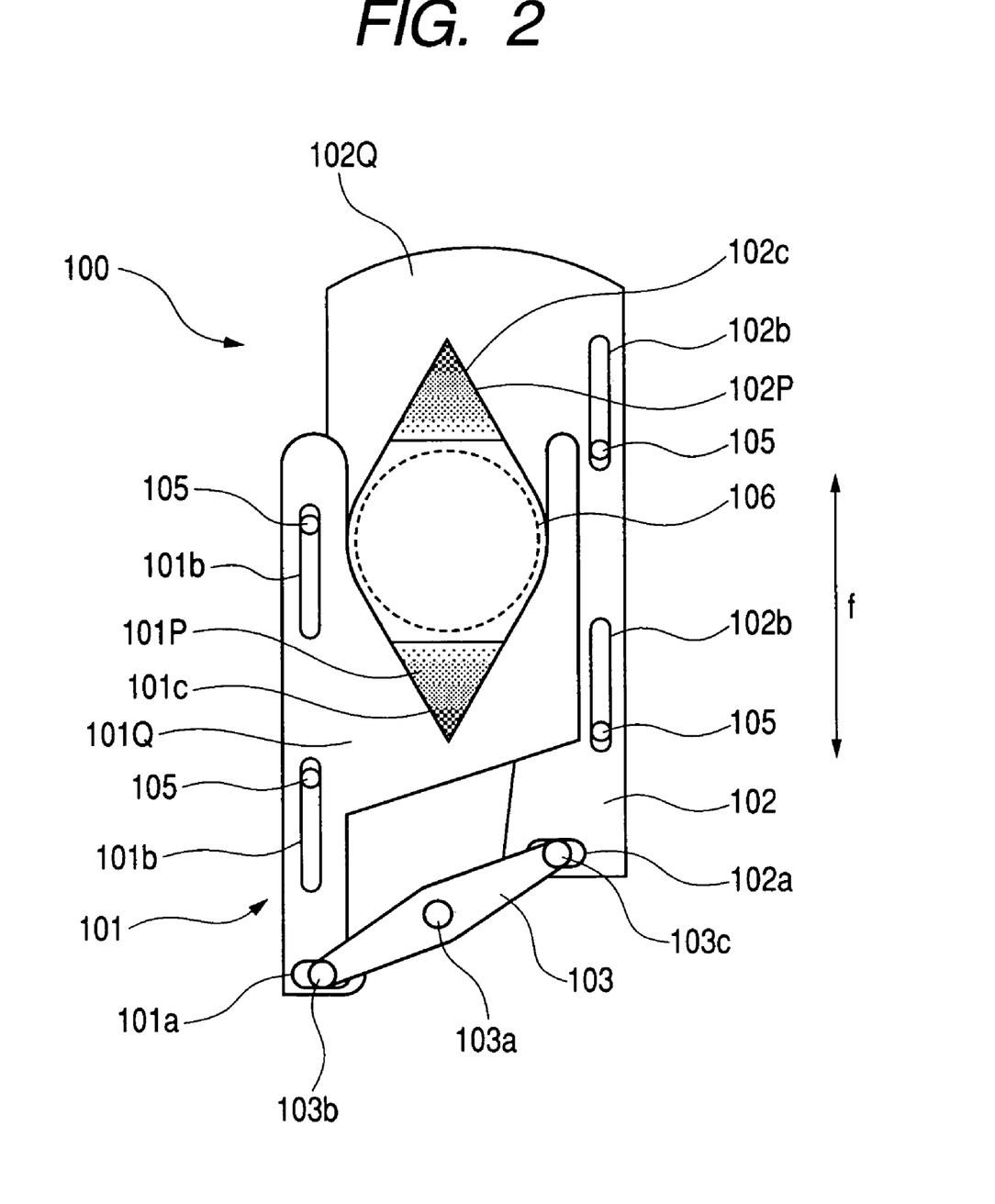
FIG. 2 schematically illustrates a light amount adjustment device using the diaphragm blade shown in FIGS. 1A and 1B.

The light amount adjustment device using the light amount adjustment member obtained by the production process according to the present invention will hereinafter be described. The present invention is not limited to the constitution described below. FIG. 1A illustrates a diaphragm blade equipped with the light amount adjustment member according to this embodiment. Description is given herein taking a diaphragm device used as a light amount adjustment device in a video camera or the like as an example. FIG. 1B is a cross-sectional view of the diaphragm blade taken along the line 1B—1B in FIG. 1A and viewed from a direction of an arrow. Reference numeral 101 in FIG. 1A indicates the whole diaphragm blade that is constructed of a light amount adjustment member 101P (gradation portion in FIG. 1A), to which a prescribed transmittance has been imparted, and a light interrupting member 101Q (a portion other than the gradation portion) for interrupting light as illustrated. As illustrated in FIG. 1B, in the diaphragm blade illustrated, the light amount adjustment member 101P and the light interrupting member 101Q are integrally formed. Reference numeral 111 in FIG. 1B indicates a transparent base material having a layer composed of a material capable of absorbing a coloring liquid, and reference numeral 112 is a colored layer having a light amount adjustment region formed in such a manner as described above. In the light amount adjustment member illustrated, a flattening layer 114 composed of a transparent resin layer is provided on both colored layer 112 and light interrupting member 101Q. In addition, an anti-reflection coating 113 is provided on the outermost surfaces of both sides thereof. In FIGS. 1A and 2, the light interrupting member 101Q is not colored for the purpose of making a boundary with the light amount adjustment member 101P clear. However, it is naturally colored black or the like because it serves to interrupt light.

FIG. 2 illustrates a light amount adjustment device using the diaphragm blade shown in FIGS. 1A and 1B. In FIG. 2, reference numeral 100 indicates the whole light amount adjustment device. Reference numeral 101 is the first diaphragm blade shown in FIGS. 1A and 1B, and reference numeral 102 is the second diaphragm blade. The second diaphragm blade 102 is produced in the same process as in the first diaphragm blade and has a light amount adjustment member 102P and a light interrupting member 102Q. Reference numeral 103 indicates a diaphragm-blade-driving lever that is fitted on a shaft of a motor (not illustrated) at a hole 103a and turned on the hole 103a. The first diaphragm blade 101 and second diaphragm blade 102 are engaged at the respective slots 101a and 102a with projected pins 103b and 103c provided at both ends of the diaphragm-blade-driving lever 103. Reference numeral 105 indicates a guide pin for a bottom plate (not illustrated) that is relatively slideably engaged with respective grooves 101b and 102b at side edges of the first and second diaphragm blades 101 and 102, 106 an optical path hole provided through the bottom plate, and 101c and 102c respective opening edges of the first and second diaphragm blades 101 and 102.

FIG. 2 illustrates a state that the diaphragm has been fully opened. When the diaphragm is closed from the state fully opened, the optical path hole 106 that is an aperture of the diaphragm is shut off by the respective light amount adjustment members 101P and 102P, to which a prescribed light transmittance has been imparted, of the first and second diaphragm blades, and the opening diameter is made small, so that the transmittance (light quantity) of a beam passing through the optical path hole 106 is gradually reduced.

Figure 3:
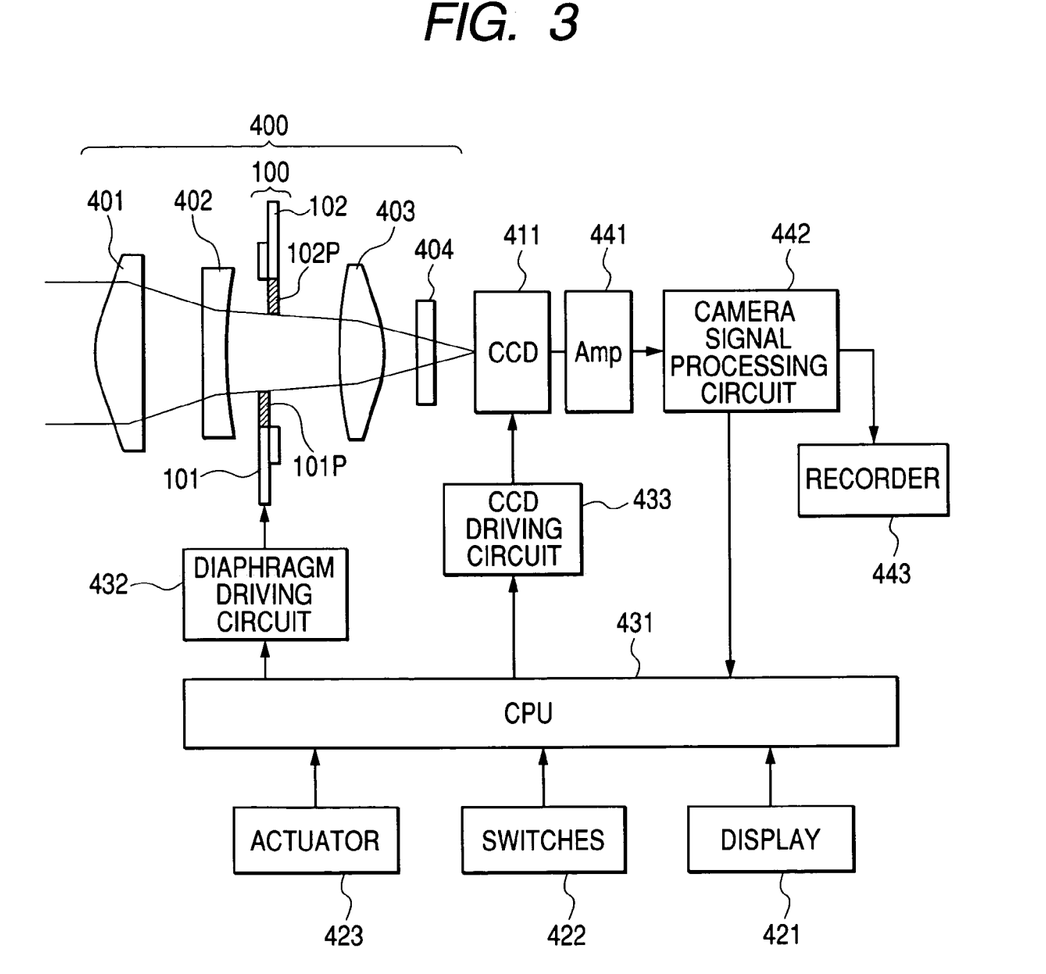
FIG. 3 typically illustrates the construction of a photographing device in which the light amount adjustment device shown in FIG. 2 has been incorporated.

FIG. 3 schematically illustrates an example where the light amount adjustment device shown in FIG. 2 has been arranged into an optical device. In this embodiment, the optical device is described taking a digital camera, in which a motion picture image or still picture image is photoelectrically converted into an electrical signal by a image pickup means, and this signal is stored as digital data, as an example. Reference numeral 400 indicates a photographing optical system composed of a plurality of lens groups that is constructed by a first lens group 401, a second lens group 402, a third lens group 403 and the diaphragm device 100 illustrated in FIG. 2. The first lens group 401 is a fixed front lens group, the second lens group 402 is a variator lens group, the third lens group 403 is a focusing lens group, and reference numeral 404 indicates an optical low-pass filter. An image pickup means 411 is arranged at a focal position (predetermined image-forming surface) in the photographing optical system 400. As this means, a photoelectrically converting means such as a two-dimensional CCD composed of a plurality of photoelectric converter parts, in which irradiation light energy is converted into electric charge, an electric charge-storing part that stores the electric charge, and an electric charge-transferring part, in which the electric charge is transferred and sent to the outside, may be used. The image pickup means 411 is driven by an image pickup means-driving circuit 433.

Reference numeral 421 indicates a display device such as a liquid crystal display, which displays a subject image taken by the image pickup means 411 such as a CCD, and operation conditions of the optical apparatus. Reference numeral 422 indicates a group of operation switches composed of a zooming switch, a photographing set up switch, a photographing start switch and a photographing condition switch that presets a shutter speed or the like. Reference numeral 423 indicates an actuator by which focusing drive is conducted to control a focusing condition of the photographing optical system 400, and other members are driven.

CPU 431 calculates whether the degree of an average density taken in coincides with a numerical value corresponding to a correct exposure stored therein or not. When a difference occurs, a diaphragm opening is changed according to an absolute value between the difference and an absolute character, or the electric charge storing time to the image pickup means 411 is changed. When the diaphragm is operated, the diaphragm-blade-driving lever 103 shown in FIG. 2 is related with the hole 103*a* as a center by a diaphragm driving circuit 432, thereby vertically sliding the diaphragm blades 101 and 102. Thereby, the size of the optical path hole 106 that is an aperture is changed. The diaphragm opening area or electric charge storing time is changed in such a manner, whereby the correct exposure can be achieved.

The subject image formed at the correct exposure on the image pickup means 411 is converted into an electric signal as a charged quantity for every pixel according to the intensity of the brightness thereof and amplified in an amplifying circuit 441 and then subjected to processing such as prescribed γ compensation in a camera signal processing circuit 442. Incidentally, this processing may be conducted by digital signal processing after A/D conversion. A video signal produced in such a manner is stored in a recorder 443.

The present invention will hereinafter be described specifically by the following Examples. Incidentally, all designations of "part" or "parts" and "%" as will be used in the following examples mean part or parts by mass and % by mass unless expressly noted.

EXAMPLE 1

A coating formulation comprising 70 parts by weight of an aqueous solution containing polyvinyl alcohol (GM-14L, trade name, product of The Nippon Synthetic Chemical Industry Co., Ltd.; polymerization degree: 1,400, saponification degree: 88 mol %) at a concentration of 15 parts in terms of solid content and 30 parts by weight of a crosslinking agent (GANTREZ AN-169, trade name, product of ISP Japan Co., Ltd.; methyl vinyl ether-maleic anhydride copolymer; molecular weight: 1,700) was prepared.

Figure 4:
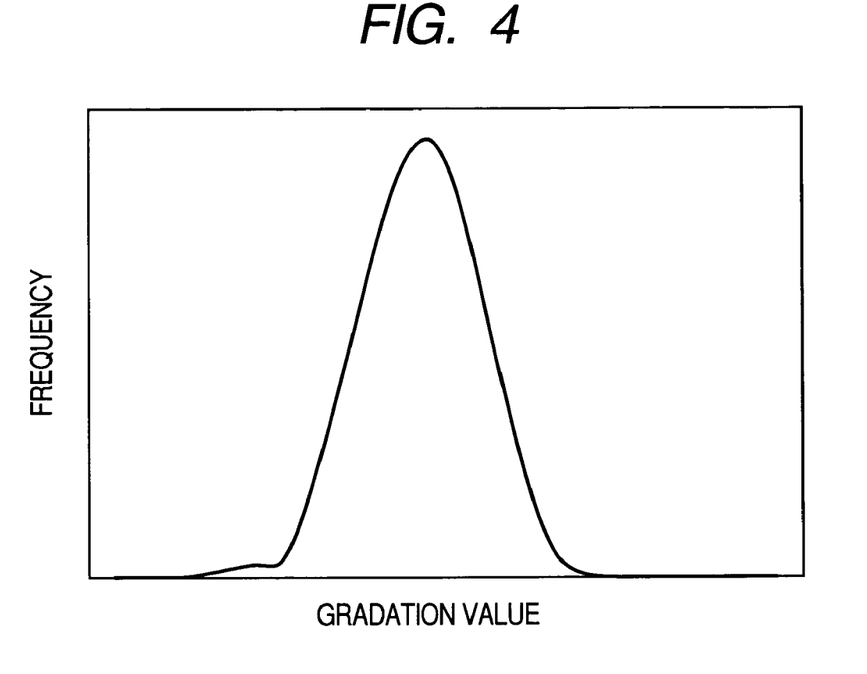
FIG. 4 illustrates a histogram of density right after the coloring step in the production process of a light amount adjustment member according to the present invention.
Figure 5:
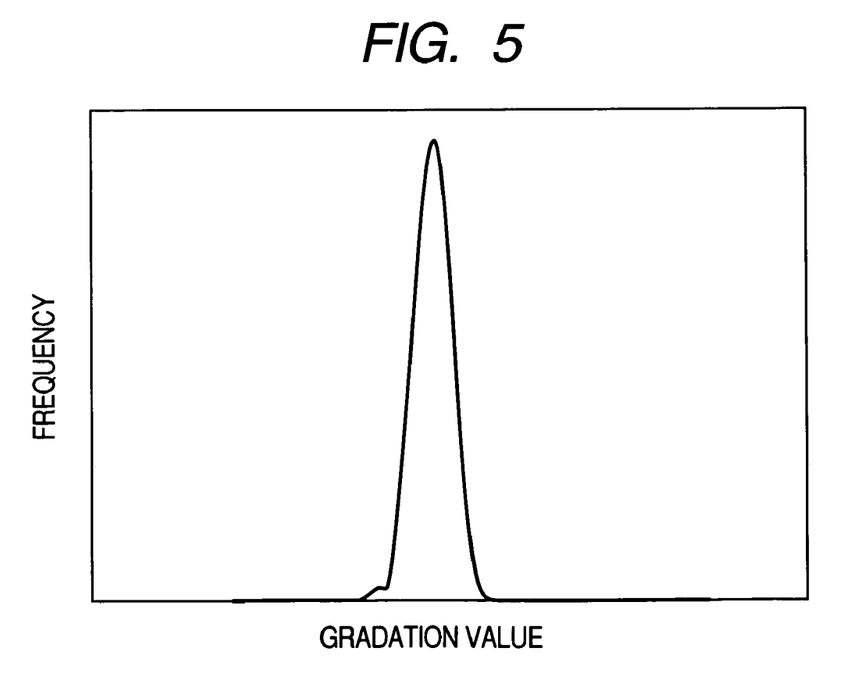
FIG. 5 illustrates a histogram of density after the step of storing at a high temperature and a high humidity in the production process of a light amount adjustment member according to the present invention.

The coating formulation thus obtained was applied to the surface of a polyethylene terephthalate film having a thickness of 100 μm as a transparent base material by means of a bar coater and dried under conditions of 100° C. and 5 minutes to form a receptive layer on the transparent base material. Two inks of a coloring liquid and a transparent liquid, which were composed of the following respective compositions, were supplied into an ink tank of an ink-jet printer (BJ F900, trade name; manufactured by Canon Inc.) of the Bubble Jet type in which an electrothermal converter was used as an energy-generating element to form a coloring portion and a transparent portion on the receptive layer formed above by means of the printer. In the first step, only the transparent liquid was first ejected on the whole surface of the transparent resin layer with one pass to swell the transparent resin layer. The transparent liquid and coloring liquid were then used to form a pattern of a light amount adjustment member. When the inks were applied by the printer at this time, the coloring liquid was applied in such a manner that the colored portion had a density gradient that the optical density of the colored portion varied continuously, and a part thereof became a transparent region. A density histogram of a uniform density portion of this sample is illustrated in FIG. 4. The density histogram is of a broad shape and the range of the gradation value is wide, indicating poor uniformity of the density. This sample was then stored for 12 hours under an environment of 40° C. and 80% RH to confirm that contours of dots of the colored portion were blurred. Its density histogram is illustrated in FIG. 5. The range of the gradation value becomes narrow, indicating improved uniformity of the density. Thereafter, drying and crosslinking were conducted under conditions of 140° C. and 10 minutes by a hot air drying oven.

Composition of the colored liquid in Example 1:

| | |
|---|---|
| C.I. Direct Black 168 | 1.5 parts |
| C.I. Direct Yellow 86 | 0.45 parts |
| C.I. Direct Yellow 132 | 0.15 parts |
| C.I. Direct Blue 199 | 0.3 parts |
| C.I. Acid Red 315 | 0.9 parts |
| Ethylene glycol | 10.0 parts |
| Ethylene glycol mono-n-butyl ether | 10.0 parts |
| Water | 76.7 parts. |

Composition of the transparent liquid:

| | |
|---|---|
| Ethylene glycol | 10.0 parts |
| Ethylene glycol mono-n-butyl ether | 10.0 parts |
| Water | 80.0 parts. |

A flattening layer was additionally provided on the colored resin layer formed in the above-described manner, which was a colored portion, and the transparent resin layer, which was a transparent portion, in the following manner. A toluene/methyl ethyl ketone solution was used to prepare a coating formulation containing a styrene-butadiene copolymer (TR2000C, trade name, product of JSR K.K.) in such a manner that the copolymer is contained in a proportion of 10 parts in terms of solid content. This coating formulation was then applied to the colored layer by means of a wire bar and dried under conditions of 100° C. and 5 minutes in a hot air drying oven. The thickness of the flattening layer thus formed was 10 μm. An anti-reflection coating was formed on the surface thereof in the same manner as described in Japanese Patent Application Laid-Open No. H6-273601 to produce a light amount adjustment member shown in FIGS. 1A and 1B.

COMPARATIVE EXAMPLE 1

A light amount adjustment member was produced in exactly the same manner as in EXAMPLE 1 except that the storing step under the environment of 40° C. and 80% RH in EXAMPLE 1 was not conducted after the coloring step.

A diaphragm device that is the light amount adjustment member according to this example produced in the above-described manner was used to evaluate the optical filters produced in EXAMPLE 1 and COMPARATIVE EXAMPLE 1 and incorporated into respective light amount adjustment devices as to optical properties.

The light amount adjustment device according to EXAMPLE 1 was incorporated into a lens of a photographing system to take a photograph of a resolving power chart, thereby measuring an MTF. Incidentally, a spatial frequency at an image surface of the resolving power chart measured is 63 line pairs/mm. As a result, an MTF in a horizontal direction under the condition that the half of an aperture had been covered with the optical filter was 60.5%.

On the other hand, the light amount adjustment member according to COMPARATIVE EXAMPLE 1, in which the storing step under the high-temperature and high-humidity environment was not conducted after the coloring step, was incorporated into a light amount adjustment device to measure an MTF. As a result, it was found to be 49.5%.

As described above, the result that the MTF value is improved by the production process of this example was yielded. In other words, the storing step under the high-temperature and high-humidity environment is conducted after the coloring step to cause boundary portions of dots formed of ink droplets to bleed, and the colored pattern is then crosslinked and fixed together with the receptive layer, whereby subsequent change in pattern is hard to occur, and shelf life is also improved. As described above, it was proved that the effect to improve the performance of the light amount adjustment member according to the present invention is sufficient.

As described above, according to the present invention, the storing step under the high-temperature and high-humidity environment is conducted after the coloring step to cause boundary portions of dots formed of ink droplets to bleed, so that diffraction at a grain boundary between dots of the colored portion is hard to occur, whereby light amount adjustment members having optical properties with little lowering of resolving power can be provided. The colored pattern is crosslinked and fixed together with the receptive layer after the storing step under the high-temperature and high-humidity environment is conducted after the colored portion is made hard to cause diffraction by causing the grain boundary between the dots of the colored portion to bleed, whereby subsequent change in pattern is hard to occur, and shelf life is also improved. Since the light amount adjustment members are produced by an ink-jet recording apparatus, they can be cheaply produced with good yield by a very simple operation. According to the present invention, in particular, there can also be provided the production processes of the light amount adjustment member, by which a light amount adjustment member having a density distribution that an optical density varies continuously or stepwise, which has been markedly difficult to achieve by other production processes, can be cheaply produced with good yield by a very simple operation. According to the present invention, there are further provided light amount adjustment members, light amount adjustment devices and photographing apparatus having excellent optical properties according to the production processes described above.

The invention claimed is:

1. A process for producing a light amount adjustment member, comprising the steps of:

providing a transparent base material having a receptive layer comprised of a material capable of absorbing a coloring liquid, wherein the receptive layer contains a resin and a crosslinking agent;

applying the coloring liquid to the layer using an ink-jet recording method to form a light amount adjustment region having a particular optical density region; and storing the layer under a prescribed environment after the application of the coloring liquid to the layer to cause dots formed by the coloring liquid to bleed and crosslinking the resin contained in the layer by the crosslinking agent.

2. The production process according to claim 1, wherein in the step of applying the coloring liquid to form the light amount adjustment region having the particular optical density region, a transparent liquid and the coloring liquid are applied to the receptive layer.

3. The production process according to claim 1, wherein the coloring liquid is applied in such a manner that the light amount adjustment region has a density distribution that varies continuously or stepwise.

4. The production process according to claim 1, further comprising the step of applying a transparent liquid to the receptive layer before the step of applying the coloring liquid to form the light amount adjustment region having the particular optical density region.

5. The production process according to claim 2, further comprising the step of applying a transparent liquid to the receptive layer before the step of applying the coloring liquid to form the light amount adjustment region having the particular optical density region.

6. The production process according to claim 3, further comprising the step of applying a transparent liquid to the receptive layer before the step of applying the coloring liquid to form the light amount adjustment region having the particular optical density region.

7. The production process according to claim 1, wherein the prescribed environment is such that a relative humidity is from 70 to 90%, and a temperature is from 30 to 70° C.

8. The production process according to claim 1, further comprising the step of providing a transparent flattening layer on the surface of the receptive layer after the step of crosslinking the resin by the crosslinking agent.

9. The production process according to claim 8, further comprising the step of providing an anti-reflection coating on the surface of the flattening layer of the light amount adjustment member and the back surface of the transparent base material after the step of providing the transparent flattening layer.

10. A light amount adjustment device comprising the light amount adjustment member produced by the production process according to claim 1.

11. A photographing device comprising the light amount adjustment device according to claim 10, a photographing optical system for forming a subject image, an image pickup means for photoelectrically converting the subject image formed and a recording means for recording a signal photoelectrically converted, wherein the light amount adjustment device is arranged in the photographing optical system.

* * * * *

UNITED STATES PATENT AND TRADEMARK OFFICE
CERTIFICATE OF CORRECTION

PATENT NO. : 7,070,344 B2
APPLICATION NO. : 10/872503
DATED : July 4, 2006
INVENTOR(S) : Kanome et al.

It is certified that error appears in the above-identified patent and that said Letters Patent is hereby corrected as shown below:

COLUMN 4:
Line 45, "resins" should read --resin--.

COLUMN 5:
Line 28, "is easy to occur." should read --easily occurs.--.
Line 42, "the" (second occurrence) should be deleted.
Line 46, "is easy to" should read --easily--.
Line 47, "occur" should read --occurs--.

COLUMN 7:
Line 55, "is" should read --be--.
Line 61, "that" should read --in which--.

COLUMN 10:
Line 43, "that" should read --in which--.
Line 57, "a" should read --an--.

COLUMN 12:
Line 15, "that" (second occurrence) should read --in which--.

Signed and Sealed this

Twentieth Day of May, 2008

JON W. DUDAS
*Director of the United States Patent and Trademark Office*